May 9, 1939.  J. T. FITZSIMMONS  2,157,599

CAPACITY CONTROL FOR IGNITION SYSTEMS

Filed Dec. 24, 1937

INVENTOR
John T. Fitzsimmons
BY
Spencer, Hardman & Heber
ATTORNEYS

Patented May 9, 1939

2,157,599

UNITED STATES PATENT OFFICE 2,157,599

CAPACITY CONTROL FOR IGNITION SYSTEMS

John T. Fitzsimmons, Anderson, Ind., assignor to General Motors Corporation, Detroit, Mich., a corporation of Delaware Application December 24, 1937, Serial No. 181,585

11 Claims. (Cl. 123—148)

This invention relates to an ignition system for an internal combustion engine and is directed to features for improving the efficiency of the system for high speed engine operation without hampering the efficiency for lower speed engine operation.

It is therefore an object of this invention to improve the efficiency of an ignition system, or the physical elements contributing to the ignition system, that will result in increased efficiency during high engine speed operation without any deleterious effect for low speed operation.

A further object of the invention is to improve the fuel firing characteristics of an ignition system during high speed engine operation.

A further object of the invention is to reduce automatically the capacity of the primary induction path coincident with engine operation over a band of high speeds.

A further object of the invention is to provide means for automatically reducing the resistance of the primary circuit coincident with a decrease of capacity therein.

A further object of the invention is to provide means automatically responsive to high speed engine operation, for increasing the efficiency of the primary ignition circuit, as the speed of the engine is increased above a predetermined range of speed.

Further objects and advantages of the present invention will be apparent from the following description, reference being had to the accompanying drawing wherein a preferred embodiment of the present invention is clearly shown.

Figure 1:
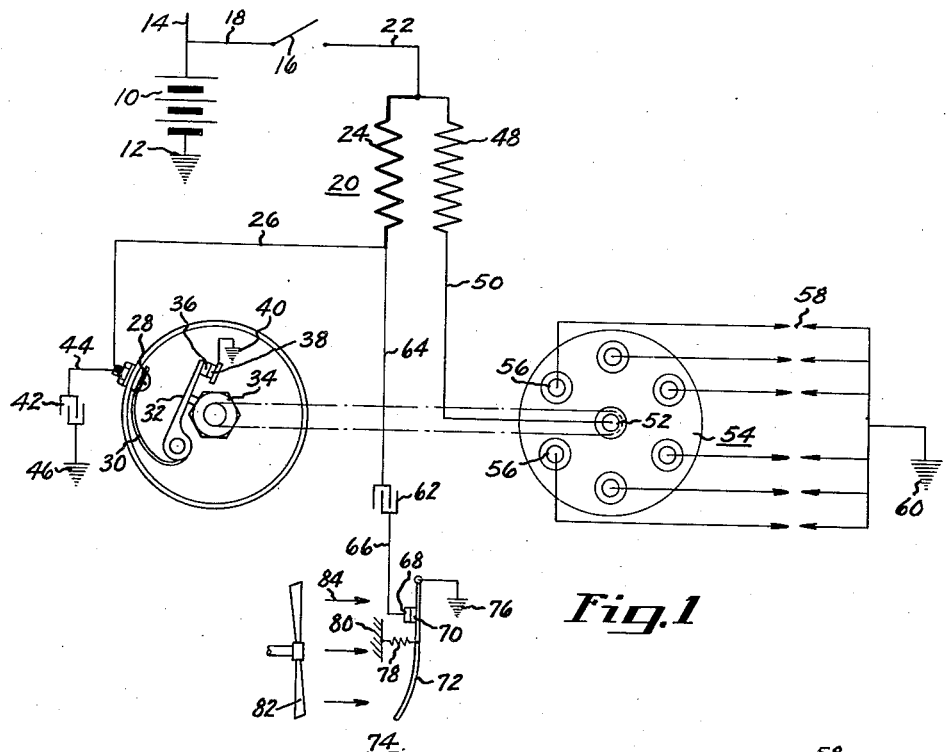
Fig. 1 is a circuit diaphragm, illustrating the instant improvement as incorporating speed responsive means in the form of an air operated switch for reducing the capacity for a primary ignition circuit during high speed engine operation.

In ignition systems for internal combustion engines, the physical elements of the system are subjected to wide variations of current characteristics, and due to the time element of current impression in the primary circuit give widely varying results at the spark plug gaps for different engine speeds. It is common practice to complete and interrupt the primary circuit by means of an interrupter, and that interruption induces a current in the secondary winding that results in igniting of the fuel charge in the engine cylinders. This function is not only a very important one, but also one that is repeated very rapidly. The distributor, the interrupter, and ignition coil along with the condenser and auxiliary parts of an eight cylinder engine complete approximately 200 operation cycles every second when the car is traveling about 60 M. P. H. In consequence thereof, it will be appreciated that the contacts of the interrupter will be in engagement for an extremely short period of time for each operation, and that while the calibration of the primary winding and interrupter may be satisfactory for engine operation at normal or moderate engine speeds, the resulting phenomenon of the spark impulse at the spark plugs may be inefficient, or wholly insufficient, to effect firing of the fuel charge at the higher or extreme engine speeds. It has been discovered that this resulting phenomenon can be made more efficient for high speed engine operation when the capacity in the primary ignition circuit about the interrupter contacts is reduced. It has also been found that an increased efficiency can be effected if the resistance of the primary circuit is reduced. It has further been determined that that reduction of capacity and resistance, when made for high speed engine operation would render the same system less efficient during low and moderate engine speeds.

In accomplishing the above stated objects, and in practicing the stated discoveries, the applicant calibrates the physical elements of his system to give the greatest efficiency for low and moderate engine speed operating conditions, and then provides means responding to a function of the engine speed for automatically reducing the capacity, or the capacity and the resistance of the primary ignition circuit, as the engine enters a selected band of high speed operation.

With particular reference to the drawing, 10 indicates a battery or source of current having a ground connection at 12, and providing a common conductor 14 with which the various electrical devices of an automobile may be connected. Since this invention relates only to the ignition system, no more than that is shown in the drawing. It includes an ignition switch 16, joined to the common conductor 14 by a lead 18, and to an ignition coil 20 by a lead 22. The ignition coil comprises a primary winding 24 having a lead 26 joining a terminal post 28, to which is fixed a circuit breaker spring 30 operating to urge a circuit breaker lever 32 into operative engagement with a cam 34 driven by the engine. The lever 32 provides a movable contact 36, spring urged to engage a fixed contact 38, with a ground connection at 40, the lever being periodically actuated by the cam 34, that always has a speed of rotation in proportion to the speed of engine operation.

About the contacts 36 and 38 there is a condenser 42, one electrode of which is in communication with the terminal post 28 by a lead 44, while the other electrode has a ground connection at 46. A secondary winding 48 joins the primary 24 and the lead 22, and is provided with a lead 50 joining a central contact 52 of a distributor 54, from which distributor, contacts 56 are provided with leads for effecting sparking phenomenon 58, having a common ground at 60. Such are the details of the ignition circuit, as provided for engine operation according to the prior art devices. For the purpose of effecting full efficiency of the primary circuit during all engine speeds, I divide the desired total capacity into two portions. I preferably select a condenser 42 of a relatively low capacity, that will satisfactorily answer the requirements for high speed engine operation, and for the purpose of maintaining the efficiency during moderate engine speed operation, I provide an additional condenser 62, with means for automatically cutting in and out the second condenser, as the conditions of engine operation would require. The two condensers 42 and 62 in their additive function make for efficiency during the lower engine speed operation. In the illustrated embodiment of Fig. 1, one of the electrodes of this second condenser 62 is connected by lead 64 to the line 26, while the other electrode is carried to ground through an interruptible connection in the lead 66. This places the condenser 62 also across the interrupter contacts.

The interruptible connection, for the return path of the condenser 62, contemplates a fixed contact 68 in cooperable relation and normally in closed relation with a movable contact 70, carried by a vane 72 of an air switch 74, which has a ground connection at 76. A restraining spring 78 anchored at 80, restrains the vane 72 from opening in response to low potential air movement from an engine cooling fan 82. The spring 78 is of such calibration that the contacts 68 and 70 will be maintained closed for all low and moderate engine speeds, yet will permit oscillation of the vane 72 upon an increase potential of the air stream 84 from the cooling fan to permit opening of the contacts 68 and 70. Since the cooling fan 82 is driven by the engine, and varies in speed directly proportional to the speed of the engine, the air switch may be calibrated to respond to any desired engine speed, so that the return circuit of the condenser 62 may be opened, and thereby reduce the capacity of the primary ignition circuit, as the engine is accelerated to enter upon the high speed band of operation.

Figure 2:
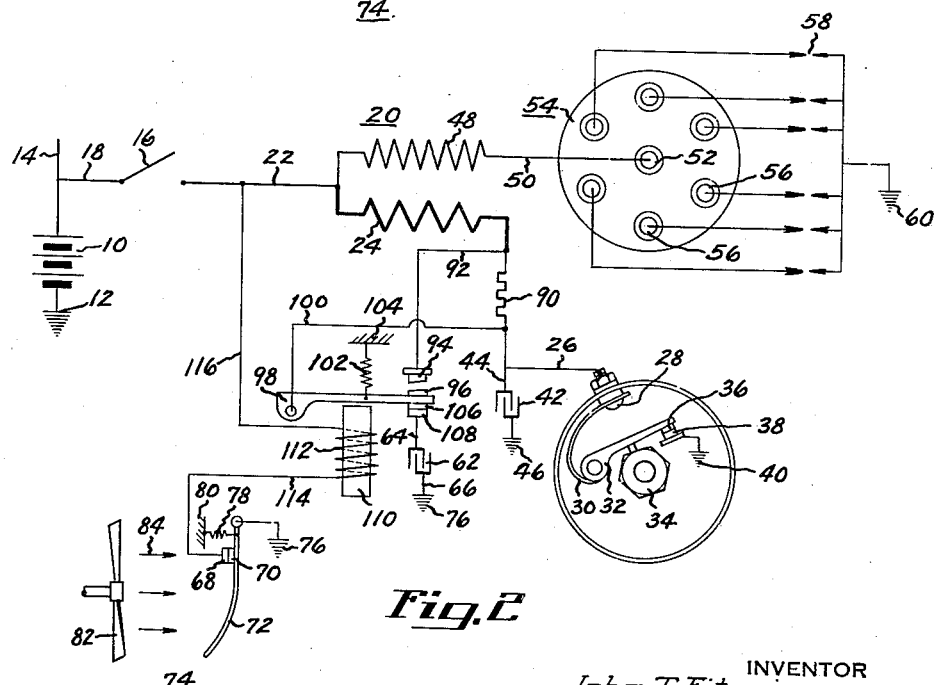
Fig. 2 is a circuit diaphragm illustrating a modification of the improvement, wherein the resistance of the ignition primary circuit is automatically reduced coincident with the reduction of capacity in the ignition primary circuit.

According to the disclosure in Fig. 2, where all elements of the ignition system common to those hereinbefore described are shown, they have been indicated by the same reference characters. This bare ignition system, contemplates one in which a resistance unit is connected in series with the primary winding and with the interrupter contacts, and which resistance unit is contemplated as causing the spark to be more nearly uniform at all engine speeds. While it has been generally believed that a resistance unit so placed allows an increased current flow at high speeds for a given maximum current at low speeds, it proves out that the increased resistance of the primary circuit is not altogether satisfactory, when included in the primary circuit during extreme high engine speeds. This is because electrical energy is always lost whenever resistance is present in a circuit. Since it is an object of this invention to reduce the resistance in the primary ignition circuit so as to have more electrical energy available, as well as to reduce the capacity of the circuit during those extremely high engine speeds, it is then desirable to by-pass this external resistance when the high speed band is entered upon.

Referring particularly to Fig. 2, a resistance unit 90 is serially connected within the lead 26 joining the primary 24 with the terminal 28, and a by-pass including interruptible contacts is provided thereabout, which comprehends a lead 92 connected between the coil and resistance 90 and joining a fixed contact 94. A movable contact 96 carried by a pivoted armature 98, is connected by a lead 100 to the other side of the resistance 90, where it joins the conductor 26. The armature 98 is urged to closed position with respect to the contact 94, by means of a spring 102 anchored at 104, and the armature carries a second movable contact 106 in cooperable relation with the fixed contact 108, to which is joined the conductor 64 leading to the condenser 62. For control of the relay, a core 110 carries a winding 112, in communication with the fixed contact 68 of the air switch, by means of a conductor 114, and the winding is in communication with the current source by a lead 116, when the switch 16 is closed.

For the purpose of illustration, let it be assumed that all speeds from idling up to 60 M. P. H. are normal or moderate engine operating speeds, and that it is for speeds above 60 M. P. H., that it is desired to effect the change in the primary ignition circuit for increasing the efficiency of engine operation. Under those assumptions, the air switch 74 will thence be calibrated to respond to the air blast 84 from the cooling fan 82, at that particular speed, to open the contacts 68 and 70. According to the embodiment of Fig. 1, the second condenser 62 will be connected across the contacts 36 and 38, and in parallel with the condenser 42, just so long as the contacts 68 and 70 of the air switch are closed, which will be satisfactory for engine operation under 60 M. P. H. According to the embodiment of Fig. 2, while the condensers 42 and 62 are connected across the contacts, the resistance 90 will be included in the primary induction circuit, and all while the engine is being operated at speeds under 60 M. P. H. That inclusion of both condensers and resistance, is by reason of the fact that the air switch 74 maintains the contacts 68 and 70 closed for speeds under 60 M. P. H., and thereby completes the circuit through the relay winding 112, which draws down the armature 98 to engage the contact 108. As the engine speed is increased above 60 M. P. H., the force of the air blast from the cooling fan 82 is sufficient to oscillate the air switch and separate the contacts 68 and 70, thereby opening the return connection from the condenser 62. In the embodiment illustrated in Fig. 2, that opening of the contacts 68 and 70 is accompanied by a retraction of the armature 98, by reason of the spring 102, whereupon the contact 94 is engaged and completes a by-pass around the resistance 90. Thus, coincident with the reduction of capacity about the contacts 36 and 38, the resistance of the primary induction circuit is also reduced, and the transition of the primary induction circuit for high speed engine operation is completed.

While the embodiment of the present invention as herein disclosed, constitutes a preferred form, it is to be understood that other forms might be adopted, all coming within the scope of the claims which follow.

What is claimed is as follows:

1. In an ignition system for an internal combustion engine having a cooling fan, and in which the ignition system includes an ignition coil and circuit breaker in circuit with a current source for effecting fuel firing, the combination comprising, a condenser shunting the circuit breaker, an auxiliary condenser in parallel with the first mentioned condenser, and means responsive to an air blast from the cooling fan for effecting operation of said second condenser.

2. The combination set forth in claim 1, wherein means for effecting operation of the second condenser comprises an air blast responsive switch having normally closed contacts, and adapted to respond to a predetermined air blast potential to open the ground connection from the said second condenser.

3. The combination set forth in claim 1, wherein an electric relay is controlled by the air blast responsive means for connecting and disconnecting the second condenser around the circuit breaker.

4. In an ignition system for an internal combustion engine, wherein the ignition system includes a primary winding in series with circuit breaker contacts for firing the fuel charge, the combination comprising, a condenser shunted about the circuit breaker contacts, and means for altering the capacity of the shunt circuit comprising, an additional condenser in parallel with the first mentioned condenser, and means responsive to predetermine engine operating conditions effect through rotation of the cooling fan for connecting and disconnecting the second mentioned condenser.

5. The combination set forth in claim 4, wherein the condenser connecting means comprises an air switch receiving its actuating force from an air blast of said cooling fan.

6. The combination set forth in claim 4, wherein the condenser connecting means comprises a relay having contacts within the circuit of the second mentioned condenser, an air switch responding to the movement of said cooling fan for controlling the energization of the winding of said relay.

7. In an ignition system having a primary winding and interrupter contacts in series, with a fixed capacity by-passing the interrupter contacts, the combination comprising, means providing an additional capacity about the interrupter contacts, and means for connecting and disconnecting the second capacity with respect to ground in response to a predetermined engine speed.

8. The combination set forth in claim 7, wherein the capacity connecting means comprises a cooling fan driven from the engine, an air switch normally completing the return connection of said second capacity, and responding to the speed of the cooling fan for altering the capacity of the ignition system.

9. The combination set forth in claim 7, wherein the means for connecting and disconnecting the second capacity comprises a relay having a plurality of contacts and an interposed armature, an air operated switch responding to the operation of the engine cooling fan and providing normally closed contacts, means connecting one of the switch contacts with a relay winding, said air operated switch and relay operating to open the connection in the second capacity in response to high speed engine operations.

10. The combination set forth in claim 7, wherein a resistance unit is inserted in series with the primary and interrupter contacts, and a by-pass is provided around the resistance unit, said by-pass including separable contacts, an auxiliary condenser, and means responding to a selected engine speed for cutting out the resistance and for disconnecting the auxiliary condenser with respect to the interrupter contacts.

11. The combination set forth in claim 7, wherein a resistance unit is inserted in series with the primary and interrupter contacts, and a by-pass is provided around the resistance unit, said by-pass including a relay providing a movable and a fixed contact normally in circuit closed relation, and means for opening the relay contacts comprising a switch responding to a predetermined engine speed, an auxiliary condenser, and means comprising a part of the relay for connecting the auxiliary condenser with said resistance when the relay contacts are opened.

JOHN T. FITZSIMMONS.